(12) United States Patent
James et al.

(10) Patent No.: US 7,380,754 B2
(45) Date of Patent: Jun. 3, 2008

(54) CLAMP BLOCK ASSEMBLIES AND METHODS

(75) Inventors: Jeremy R. W. James, Wichita, KS (US); Lance A. Cutler, Maize, KS (US)

(73) Assignee: The Boeing Company, Chicago, IL (US)

( * ) Notice: Subject to any disclaimer, the term of this patent is extended or adjusted under 35 U.S.C. 154(b) by 492 days.

(21) Appl. No.: 10/956,001

(22) Filed: Sep. 30, 2004

(65) Prior Publication Data

US 2006/0071475 A1 Apr. 6, 2006

(51) Int. Cl.
*B64D 37/06* (2006.01)
*F16L 25/04* (2006.01)

(52) U.S. Cl. .................................. 244/135 R; 285/420

(58) Field of Classification Search ............ 244/135 R, 244/135 A; 285/420, 406, 242, 248, 411, 285/413, 415, 217

See application file for complete search history.

(56) References Cited

U.S. PATENT DOCUMENTS

| | | | | |
|---|---|---|---|---|
| 3,297,383 | A * | 1/1967 | Fay | 312/265.4 |
| 5,188,397 | A * | 2/1993 | Hynes | 285/24 |
| 5,246,143 | A * | 9/1993 | Cherfane | 222/145.2 |
| 6,315,335 | B1 * | 11/2001 | Seedorff | 285/415 |
| 6,367,849 | B1 * | 4/2002 | Tatsuta et al. | 285/373 |
| 6,520,710 | B2 * | 2/2003 | Wells | 403/344 |
| 7,036,770 | B2 * | 5/2006 | Shelly et al. | 244/135 A |
| 7,111,876 | B2 * | 9/2006 | Hayashi et al. | 285/415 |

* cited by examiner

Primary Examiner—Tien Dinh
(74) Attorney, Agent, or Firm—Lee & Hayes, PLLC

(57) ABSTRACT

Clamping devices and methods for supporting pipes that experience biaxial loading forces are provided. The clamping device transmits forces from the pipe to surrounding supporting frame structure. In one embodiment, a clamp apparatus includes a first piece having first and second staggered notches and a second piece having first and second staggered notches. The first and second pieces are placed in contact with each other with the first staggered notches of the first and second pieces contacting each other and the second staggered notches of the first and second pieces contacting each other. The clamp apparatus forms a cavity for receiving a pipe.

11 Claims, 2 Drawing Sheets

CLAMP BLOCK ASSEMBLIES AND METHODS

GOVERNMENT LICENSE RIGHTS

This invention was made with Government support under U.S. Government contract F33657-98-D-0002 awarded by the Air Force. The Government has certain rights in this invention.

FIELD OF THE INVENTION

This invention relates generally to structural support devices and, more specifically, to support devices for pipes that experience loads.

BACKGROUND OF THE INVENTION

Pipes that transport high pressure, high quantity amounts of fluid must be properly supported in the environment in which they are used. For example, a re-fueling aircraft, such as MC-130H Combat Talon II or a KC-10, includes a re-fueling system that drives large amounts of fuel through the pipes to re-fueling drogues. Presently, the pipes of the re-fueling system are supported by standard C-clamps that attach the pipe to surrounding aircraft frame structure. Biaxial loads occur in the pipes at joints of the pipe. The present clamping system limits biaxial movement of the pipes near the joint locations. Also, biaxial loads are experienced by the pipes themselves with little transfer of the loading forces to the surrounding frame structure occurs.

Therefore, there exists a need to install pipe supports that transfer biaxial loading forces away from the pipe and to surrounding supporting frame structure. Also, there exists a need to support pipes of fuel lines without experiencing any deterioration due to fuel contamination.

SUMMARY

The present invention provides clamping devices and methods for supporting pipes that experience biaxial loading forces. The clamping device transmits forces from the pipe to surrounding supporting frame structure. In one embodiment, a clamp apparatus includes a first piece having first and second staggered notches and a second piece having first and second staggered notches. The first and second pieces are placed in contact with each other with the first staggered notches of the first and second pieces contacting each other and the second staggered notches of the first and second pieces contacting each other. The clamp apparatus forms a cavity for receiving a pipe.

In accordance with further aspects of the invention, the first and second pieces are bolted together and attached to a frame structure with flange.

In accordance with another aspect of the invention, the frame structure includes second and third flanges that are substantially perpendicular to the first flange.

In accordance with yet another aspect of the invention, a support material is attached to walls of the first and second pieces that form the pipe receiving cavity. The support material includes a rubberized cork material, such as butyl-N rubber.

BRIEF DESCRIPTION OF THE DRAWINGS

Preferred and alternate embodiments of the present invention are described in detail below with reference to the following drawings.

DETAILED DESCRIPTION

The present invention relates to support assemblies and methods. Many specific details of certain embodiments of the invention are set forth in the following description and in FIGS. 1-6 to provide a thorough understanding of such embodiments. One skilled in the art, however, will understand that the present invention may have additional embodiments, or that the present invention may be practiced without several of the details described in the following description.

Figure 1:
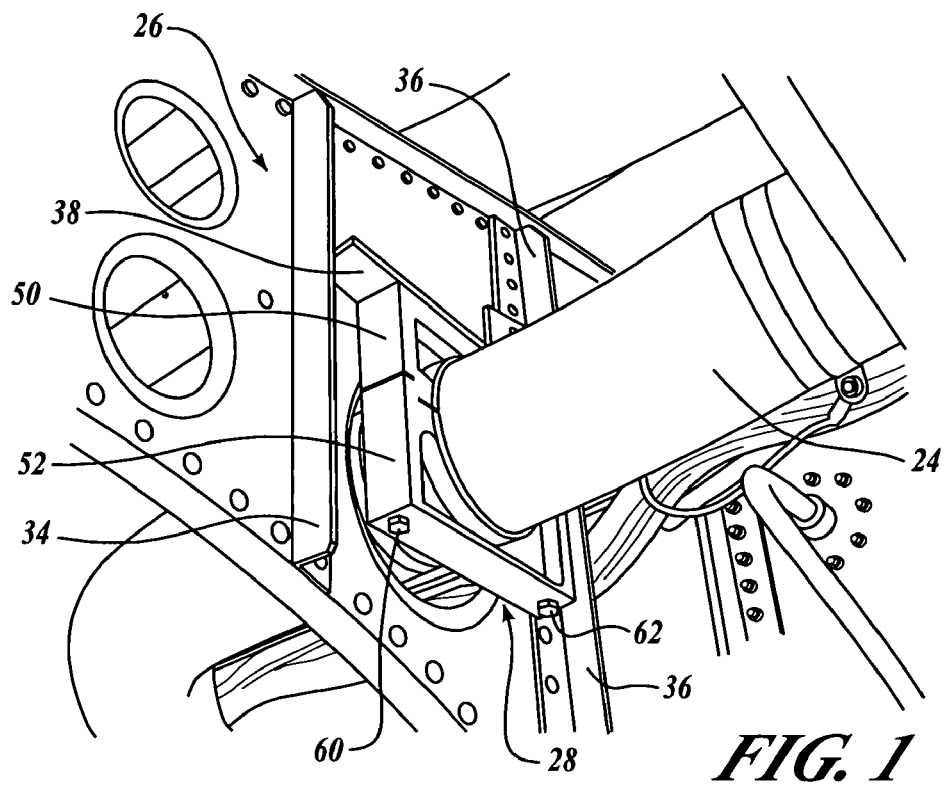
FIGS. 1 and 2 are perspective views of a clamp block assembly formed in accordance with an embodiment of the present invention.
Figure 2:
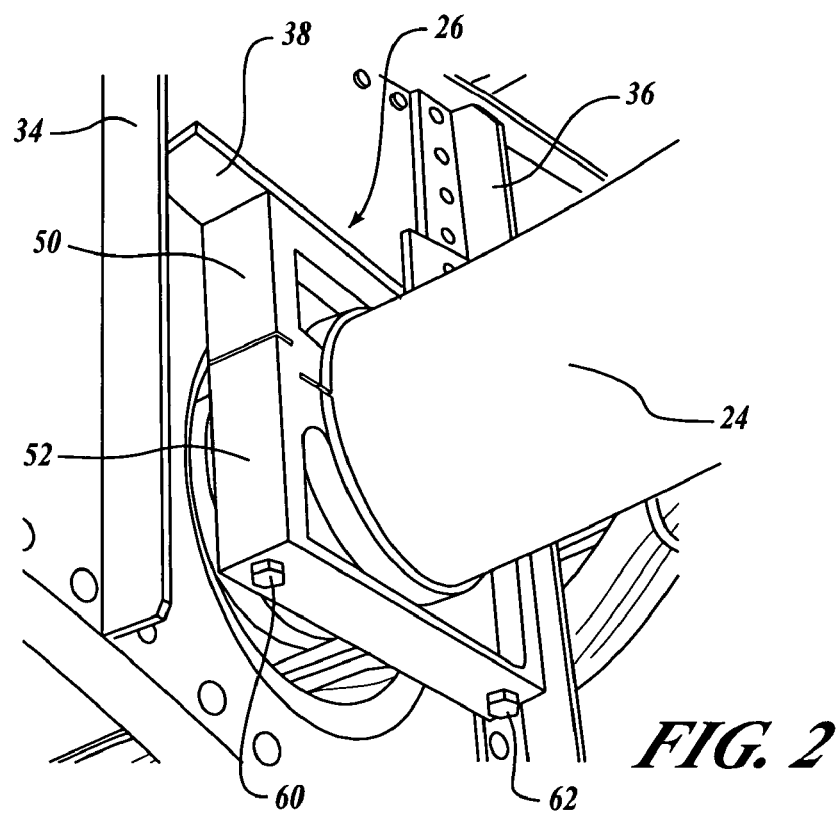
Figure 3:
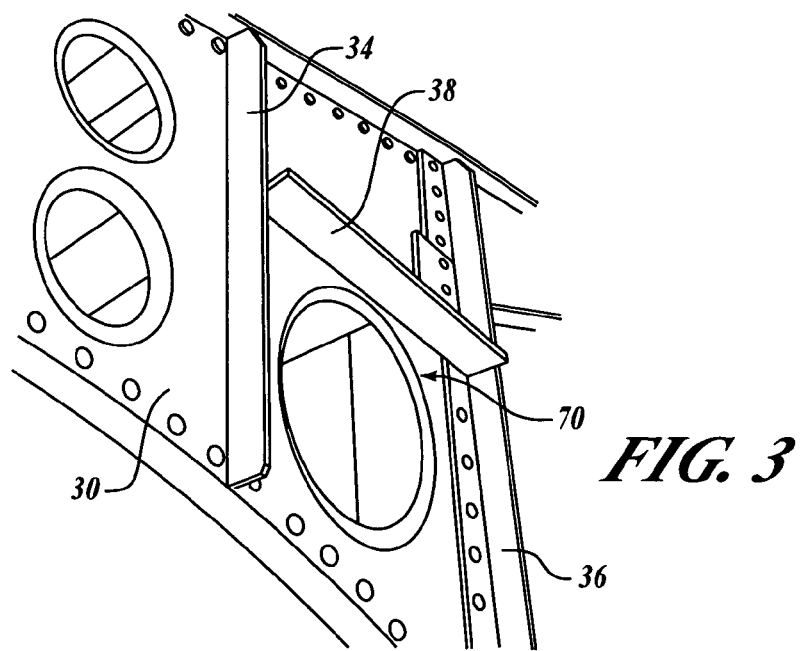
FIG. 3 is a perspective view of a mounting structure formed in accordance with an embodiment of the present invention.

As shown in FIGS. 1 and 2, a pipe 24 is supported after a bend in the pipe 24 by a clamp assembly 26. The clamp assembly 26 includes a clamp block assembly 28 attached to a structural support 38. The clamp block assembly 28 includes a first section 50 and a second section 52 that are attached to a first structural support 38 by bolts 60 and 62 that pass through the sections 50 and 52. The clamp assembly 26 includes second and third structural supports 34 and 36 that attach to existing frame structural supports, which are structural supports of an aircraft in one embodiment, and to the first structural support 38. The second and third structural supports 34 and 36 include flanges that provide additional structural support. The first structural support 38 also includes a flange that is approximately perpendicular to the flanges of the second and third structural supports 34 and 36. The clamp block assembly 28 supports the pipe 24 as it passes through an opening 70 located between the first and second structural supports 34 and 36, as shown in FIG. 3.

Figure 4:
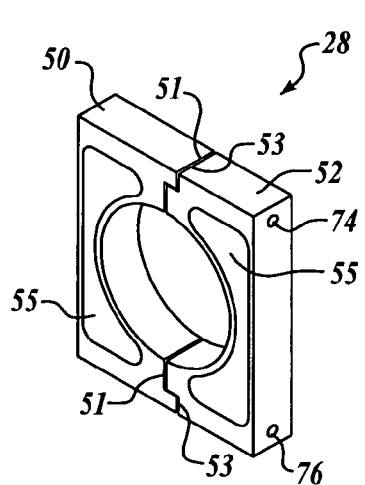
FIG. 4 is a perspective view of the clamp block assembly shown in FIGS. 1 and 2.
Figure 5:
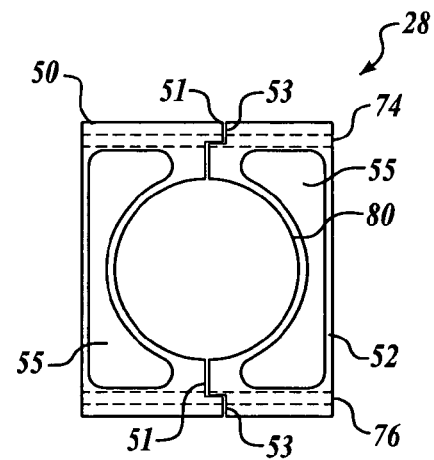
FIG. 5 illustrates a side view of the clamp block assembly of FIG. 4.

Referring to FIGS. 4 and 5, the adjoining, connecting edges of the first and second sections 50 and 52 that come in contact with each other are "stepped" or include "staggered notches". In one embodiment, the connecting edges 51 of the first section 50 steps up a unit amount when progressing from the center of the circular hole formed by the clamp block assembly 28 and progressing radially out from that center point. The connecting edges 53 of the second section 52 steps down when traveling from the center point of the hole radially outward therefrom.

In one embodiment, the sections 50 and 52 included hollowed out regions 55 on each lateral side, thereby reducing the overall weight of the sections 50 and 52. The staggered notches of the connecting edges 51, 53 transmit side loads of a pipe received by the clamp block assembly 28 through the sections 50 and 52 and thus through the attached first structural support 38 and other attached support structural supports 34 and 36. In one embodiment, the pieces 50 and 52 are machined from aluminum blocks and include machined holes 74 and 76 that pass through outer edges of the sections 50 and 52 through the staggered notches.

Referring to FIGS. 1 and 2, the bolts 60 and 62 pass through the holes 74 and 76 (FIG. 4) and are bolted to the flange of the structural support 38. Other attachment devices may be used to attach the clamp block assembly 28 to the flange of the structural support 38 or may be added to complement the bolts 60 and 62, such as an adhesive.

As shown in FIG. 5, included along the inner circular edge that forms the circular cavity of the clamp block assembly 28 is a fuel resistant and friction absorbing component 80. Examples of the component 80 include a rubberized fuel resistant cork such as butyl-N rubber. The component 80 is bonded to the inner circular edge of the sections 50 and 52 suitably using a fuel resistant bonding agent. In other applications where the pipe 24 is not transporting high pressured fuel, then the component 80 need not be formed of a fuel resistant material nor need be bonded by a fuel resistant bonding agent. In one embodiment, the component 80 is a rubber insert such as nitrile rubber sheet. The nitrile rubber sheet is bonded using any number type of bonding agents such as those produced by QPL, 3M, and Bostik Finley. Example of nitrile rubber sheets are available from Aero® Rubber Company.

Figure 6:
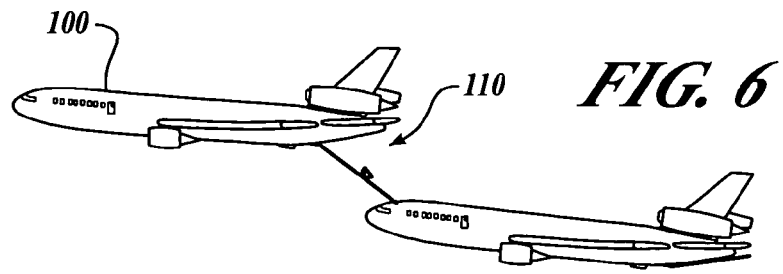
FIG. 6 is a side view of a re-fueling aircraft operating with a re-fueling system that includes clamp block assemblies shown in FIGS. 1-5.

FIG. 6 illustrates a KC-10 re-fueling aircraft 100 that include a re-fueling system 110 having one or more clamp block assemblies 28 for supporting manifold pipes. The high pressure re-fueling system 110 of the KC-10 aircraft 100 produces biaxial loading forces at or near manifolds. The clamp block assembly 28 advantageously reduces the stress that prior pipes experienced with previous clamp systems. The high pressure re-fueling system 110 may be used in other aircraft, such as a MC-130H Combat Talon II.

While preferred and alternate embodiments of the invention have been illustrated and described, as noted above, many changes can be made without departing from the spirit and scope of the invention. For example, the clamp block assembly 28 may be used in ground-based applications. Accordingly, the scope of the invention is not limited by the disclosure of these preferred and alternate embodiments. Instead, the invention should be determined entirely by reference to the claims that follow.

What is claimed is:

1. A refueling aircraft with a refueling system, the refueling system comprising:
    at least one refueling manifold; and
    at least one clamp apparatus for supporting the at least one refueling manifold, the at least one clamp apparatus including:
        a first piece having a first pair of engagement edges including first and second staggered notches formed therein defined by first and second outer extensions and first and second inner indentations, the first piece having a plurality of planar side surfaces; and
        a second piece having a second pair of engagement edges including first and second staggered notches formed therein defined by first and second outer indentations and first and second inner extensions, the second piece having a plurality of planar side surfaces, the first and second pieces being asymmetrical with respect to each other,
    wherein when the first and second pieces are placed in contact with each other a clamp block assembly is defined, the inner extensions of the second piece being matedly received within the inner indentations of the first piece, the clamp block assembly thus forming a circular cavity therebetween for slideably receiving the at least one refueling manifold, the plurality of planar side surfaces of the first and second pieces defining a rectangular outer boundary of the clamp block assembly.

2. The system of claim 1, wherein the first and second pieces each include a pair of cavities formed therethrough, the system further comprising two securing members being received through the cavities of the first and second pieces for securing the first piece to the second piece.

3. The system of claim 2, wherein the at least one clamp apparatus further includes a frame structure including a first flange, wherein the first flange is attached to the two securing members, and wherein the first flange is in contact with one of the planar side surfaces of the first and second pieces.

4. The system of claim 3, wherein the frame structure includes second and third flanges being substantially perpendicular to the first flange.

5. The system of claim 1, wherein the at least one clamp apparatus further includes a support material attached to curved wall portions of the first and second pieces that form the pipe receiving circular cavity.

6. The system of claim 5, wherein the support material includes at least one of a rubberized cork material, and butyl-N rubber.

7. The system of claim 6, wherein the rubberized cork material is substantially fuel resistant.

8. The system of claim 5, wherein the support material is attached to the curved wall portions of the first and second pieces by a bonding agent.

9. The system of claim 8, wherein the bonding agent is a fuel resistant bonding agent.

10. The system of claim 8, wherein the bonding agent is fire retardant.

11. The system of claim 1, wherein hollowed out regions are defined on lateral sides of the first piece and the second piece.

* * * * *